United States Patent
Lawrence et al.

(10) Patent No.: US 6,237,831 B1
(45) Date of Patent: May 29, 2001

(54) SOLDER COLLECTING CAPSULE AND SOLDER EXTRACTING DESOLDERING TOOL USING SAME

(75) Inventors: David W. Lawrence, Clarksville; Dung T. Le, Silver Spring; William Jordan Siegel, N. Bethesda, all of MD (US); David Lee Gilbert, Collegeville, PA (US)

(73) Assignee: Pace, Incorporated, Laurel, MD (US)

( * ) Notice: Subject to any disclaimer, the term of this patent is extended or adjusted under 35 U.S.C. 154(b) by 0 days.

(21) Appl. No.: 09/510,682

(22) Filed: Feb. 22, 2000

Related U.S. Application Data

(63) Continuation-in-part of application No. 09/323,707, filed on Jun. 1, 1999.

(51) Int. Cl.[7] .................................. B23K 1/00; B23K 3/00

(52) U.S. Cl. ........................... 228/20.5; 228/19; 219/227

(58) Field of Search .................................. 228/20.5, 20.1, 228/19, 191, 264; 219/227, 229

(56) References Cited

U.S. PATENT DOCUMENTS

| | | |
|---|---|---|
| 3,690,539 | 9/1972 | Geiger . |
| 4,221,017 * | 9/1980 | Fortune . |
| 4,439,667 | 3/1984 | Sylvia . |
| 5,007,574 | 4/1991 | Carlomagno et al. . |
| 5,143,272 | 9/1992 | Carlomagno et al. . |
| 5,579,982 * | 12/1996 | McDavid, Jr. et al. . |
| 5,893,992 * | 4/1999 | Kilmer . |
| 5,945,015 * | 8/1999 | Feinler . |

FOREIGN PATENT DOCUMENTS 0 365 034    4/1990   (EP) .

* cited by examiner

*Primary Examiner*—Patrick Ryan
*Assistant Examiner*—Jonathan Johnson
(74) *Attorney, Agent, or Firm*—Nixon Peabody LLP; David S. Safran

(57) ABSTRACT

A disposable solder receiving capsule for a hand held vacuum solder extracting desoldering tool is formed of an outer tube which is closed at one end by a porous filter and has an opening at its opposite end, and a hollow solder collection chamber part, having a tubular member with an open end and which is closed with respect to the passage of solder therethrough at an opposite end, forming a solder receiving space within it. The solder collection chamber part is concentrically positioned within the outer tube with an air plenum disposed between the closed end of the chamber part and the filter and with at least one air channel extending the length of solder collection part for providing a path for gases entering the open end of the outer tube to the plenum and the filter that is separated from the solder receiving space. For facilitating solder reclamation, the capsule can be formed entirely of materials which are shape-sustaining when exposed to a temperature of 400° F., are not reactive with either solder and flux, which will burn with little or no residue at a temperature less than 800° F. A desoldering tool for use with the capsule has a detachable, tubular capsule holding part that is open at each of its opposite ends for enabling a solder receiving capsule received in it to be removed from one of the end of the holding tube by pushing another soldering capsule into the opposite end of the holding tube when the detachable holding part is detached from the body of the desoldering tool. In a most preferred embodiment, the tool is designed so that solder cannot be drawn into it if the capsule has not been inserted or has been inserted incorrectly.

13 Claims, 9 Drawing Sheets

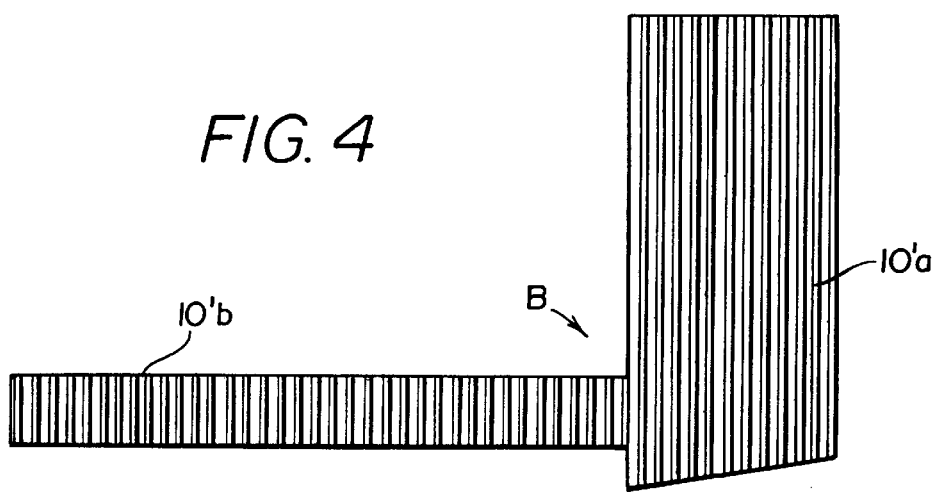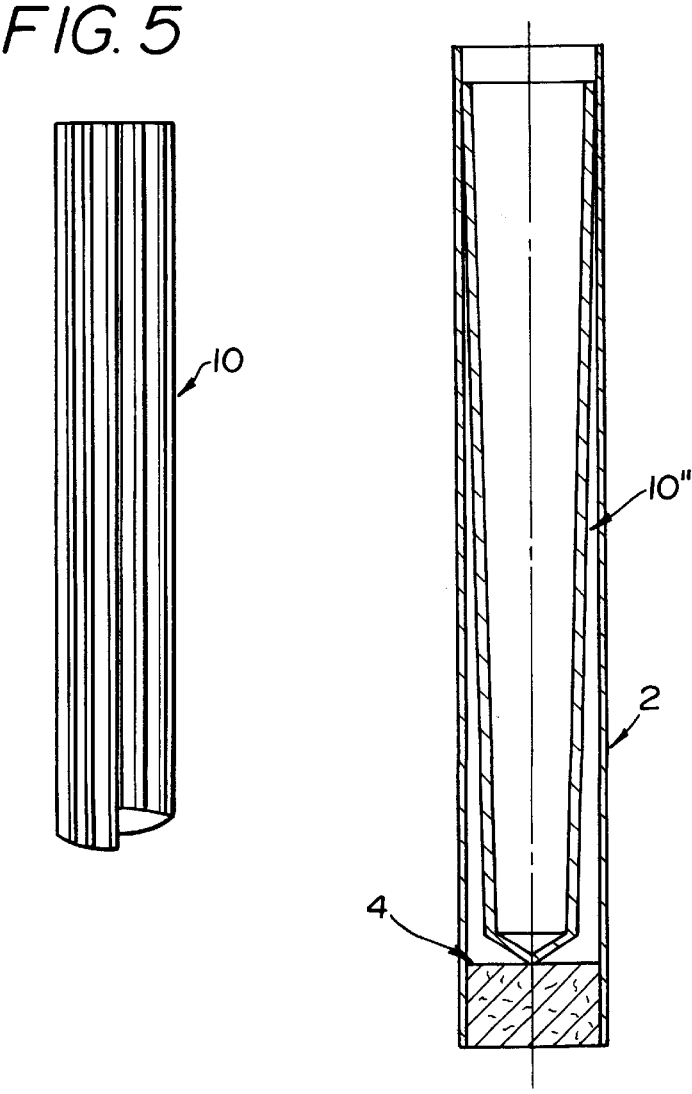

Molded Pulp Standoff

Pinched Kraftpaper Tube Standoff

Molded Plastic Standoff

Rolled Corrugated Paper Standoff

Die Cut Paper "Table" Standoff

US 6,237,831 B1

SOLDER COLLECTING CAPSULE AND SOLDER EXTRACTING DESOLDERING TOOL USING SAME

CROSS REFERENCE TO RELATED APPLICATION

This application is a continuation-in-part of commonly owned, co-pending U.S. patent application Ser. No. 09/323,707.

BACKGROUND OF THE INVENTION

1. Field of the Invention

The present invention is directed to solder extracting type desoldering tools, and in particular, to such desoldering tools in which the extracted solder is collected in a disposable capsule.

2. Description of Related Art

In solder extracting type desoldering tools, a vacuum is used to draw the re-melted solder into the desoldering tool where it is collected in a solder collecting receptacle of one type or another. While, in some cases, a removable porous solder retention pad, liner or baffle has been provided to retain the collected solder in the collecting receptacle and/or to facilitate removal of the collected solder. An example of one such type of desoldering tool is described in U.S. Pat. Nos. 5,143,272 and 5,007,574 in which a tray like receptacle is a removable, but permanent, part of the tool and in which a removable porous solder retention pad is disposed. Among the short-comings of such desoldering tools are the facts that the tool can only be used in certain orientations and during use the suction flow path can become obstructed with solder and flux, thereby causing the suction force to fall off and the ability of the tool to extract solder is impaired as a result.

Substantially contemporaneous with the present invention, a desoldering tool was introduced by Weller under Model No. SCD-100 in which solder is collected in a disposable cylindrical capsule which is open at one end for receiving the extracted molten solder and is closed at the opposite end by a filter through which the solder extracting vacuum is drawn. To prevent the filter from immediately becoming obstructed by the extracted solder, a metal baffle is disposed within the capsule chamber for the purpose of causing the extracted to solder to solidify thereon. However, in practice, the baffle cannot predictably insure that the intended amount of solder is extracted before a vacuum failure occurs, i.e., sometimes the capsule is able to sufficiently fill with solder and other times vacuum failure might occur well before the capsule is adequately filled with extracted solder. Furthermore, the use of such baffles reduces the effective volume of the capsule to such an extent that a low volumetric efficiency is obtainable even under the best of circumstances, thereby causing the rise time (i.e., the time to reduce the pressure sufficiently to draw the solder up into the tool) to be longer than is optimally desirable. Additionally, since the capsule body is formed of the plastic material Kapton® (which has a usable temperature range of up to 800° F.) and the baffle is made of a metal, such as stainless steel (with a melting point of around 2000° F.), recycling of the extracted solder is not practical since it cannot be easily removed from the capsule, and the capsule and baffle cannot be burnt off at sufficiently low temperatures. Still further, exchanging of a filled capsule with new, empty one is not a simple process that can be performed quickly (which is essential in production facilities) since the capsule is hot, all of the extracted solder may not have solidified, and withdrawal of the capsule requires significant manipulation of the desoldering tool and the capsule itself.

SUMMARY OF THE INVENTION

In view of the foregoing, it is a primary object of the present invention to provide a solder collecting capsule for an extraction type desoldering tool which has a high volumetric efficiency and predictably insures that the intended amount of solder is extracted before a vacuum failure occurs, i.e., failure does not occur until the capsule has reached its intended capacity.

It is another object of the present invention to provide a solder collecting capsule for an extraction type desoldering tool which facilities recovery and recycling of the extracted solder.

Still another object of the present invention is to create a solder collecting capsule and extraction type desoldering tool for use therewith which will enable exchanging of a filled capsule with a new, empty one simply and quickly.

Yet another object of the present invention is to devise a solder collecting capsule and extraction type desoldering tool for use therewith which are constructed such that the desoldering tool will not be able to draw molten solder into it if the tool is inadvertently operated without a solder collecting capsule in place or with the solder collecting capsule inserted backwards.

A further object of the invention is provide a solder collecting capsule and extraction type desoldering tool for use therewith which are designed to shield the vacuum seal from contact with the molten solder being extracted as well as to insure that the molten solder extracted into the capsule will not flow back into the riser tube of the tool.

The first of these objects is obtained in accordance with preferred embodiments of the invention the creation of a capsule having a defined solder receiving space and separate gas extraction flow paths that are constructed, on the one hand, allow the use of a smaller capsule for receiving a given quantity of solder, thereby reducing rise time, and on the other hand, insures that vacuum failure does not occur until the solder receiving space is full.

The second of these objects is obtained by the solder receiving capsule being made entirely of materials that can be burnt off at sufficiently low temperatures, e.g., less than about 500° F.

The third of these objects is achieved by constructing the solder receiving capsule and its holding structure within the desoldering tool so that a new solder receiving capsule itself can be used to push out the full one as it is installed.

The fourth and fifth objects are achieved by a special configuring of vacuum seal and the end of the capsule intended to seal thereagainst together with use of an riser tube of proper length.

These and other objects, features and advantages of the present invention will become apparent from the following description when taken in connection with the accompanying drawings which, for purpose of illustration only, show several embodiments in accordance with the present invention.

BRIEF DESCRIPTION OF THE DRAWINGS

FIG. 4 is a plan view of a corrugated paper blank for forming an insert of the FIG. 2 solder receiving capsule;

FIG. 5 is an elevational view of the blank of FIG. 4 rolled into the insert of FIG. 2;

FIGS. 6 & 7 are views corresponding to FIGS. 2 & 3, but of a preferred embodiment of solder receiving capsule in accordance with the present invention;

DETAILED DESCRIPTION OF THE INVENTION

Figure 1:
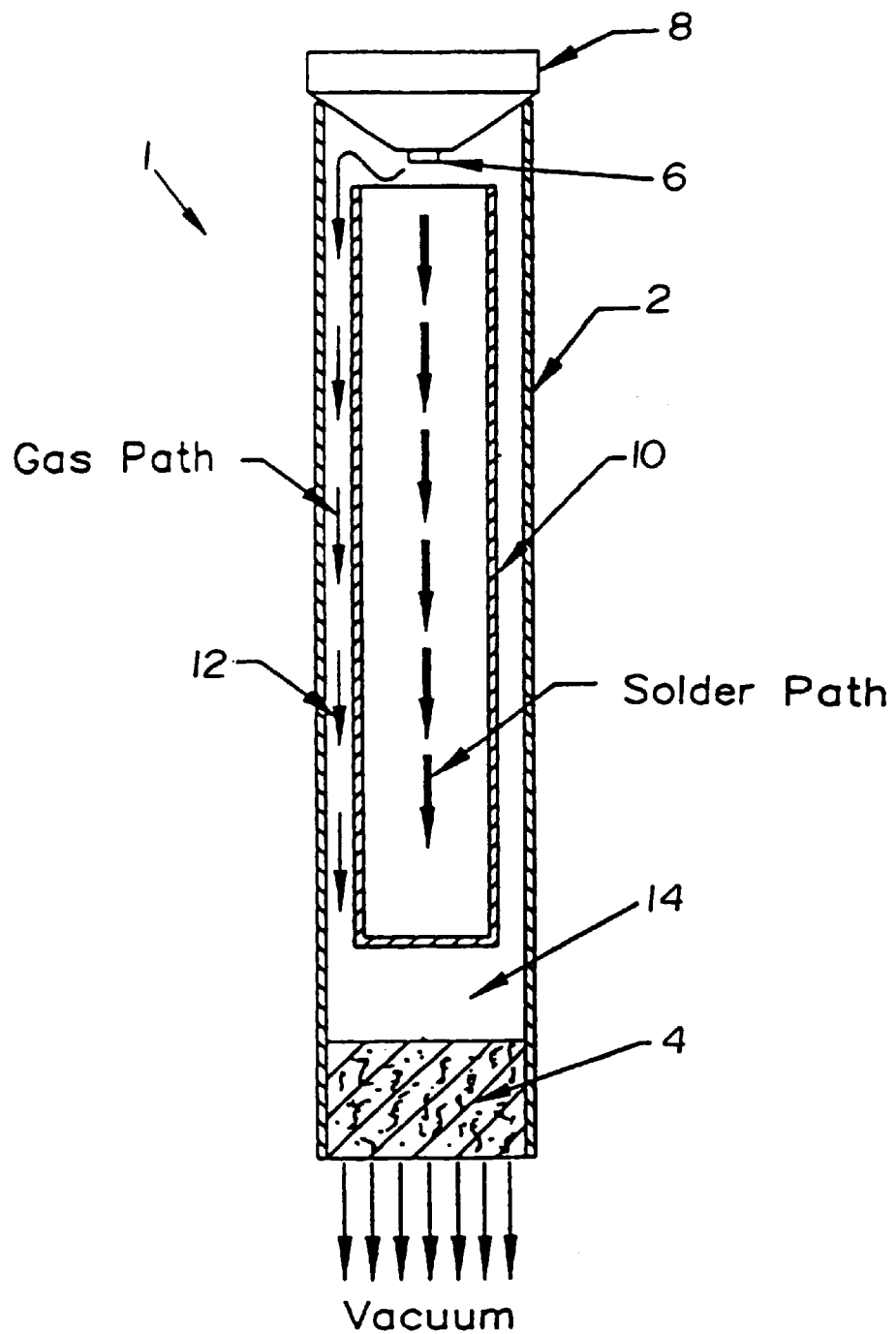
FIG. 1 is a diagram depicting the basic concepts embodied in the solder receiving capsule in accordance with the present invention.

FIG. 1 is a generalized representation of a solder receiving capsule 1 in accordance with the present invention that is designed to separate molten solder from gases in a hand held vacuum solder extracting desoldering tool. Capsule 1 comprises an outer tube 2 which is closed at one end by a porous filter 4, and is open at its opposite end, either completely or via a riser tube 6 which passes through a seal 8 (as will be described below, preferably the riser tube 6 and seal 8 are part of the desoldering tool, not the capsule 1, the riser tube being formed as an extension of an exchangeable, hollow desoldering tip). Concentrically positioned within the outer tube 2 (in manners described below for the various embodiments) is a closed end solder collection chamber part 10 creating a least one air chamber 12 (a single annular chamber being shown in FIG. 1) about the collection chamber part 10 and an air plenum 14 between the chamber part 10 and the filter 4.

By exposing the filter 4 to a vacuum source, air in the capsule 1 is evacuated through the filter 4 and once the pressure within the capsule 1 has been lowered sufficiently, molten solder and gases (air and fumes provided during melting of the solder) are drawn from the desoldering site into the desoldering tool, to and through the riser tube 6, the molten solder passing into the interior of the solder collection chamber part 10 (as depicted by the bold arrow solder path in FIG. 1), while the gases pass around the chamber part 10 (as depicted by the thin arrow gas path in FIG. 1) and out through the filter 4. Because of these separate flow paths, a well defined vacuum failure mode is created in that filter will not be blocked until the chamber part 10 is full and overflows blocking the gas path, there being very little decrease in vacuum performance until then. Furthermore, the volumetrically efficient configurations for the chamber part 10 can be used, maximizing the amount of solder that can be collected in a capsule of given size, thereby allowing the capsule 1 to be made as small as possible with the result that rise times can be minimized since the capsule volume which needs to be evacuated can be reduced.

For producing a disposable capsule 1, any material that can maintain its shape when exposed to a temperature of 400° F. and is not reactive with either solder or flux may be used to produce the outer tube 2, filter 4 and collection chamber part 10. Among those materials usable for the outer tube 2 are paper, molded paper pulp, cardboard, mylar, Kapton®, Teflon®, Goretex®, silicone, and ceramic paper; however, the use of paper, molded paper pulp, cardboard or any other material which will burn with little or no residue at temperatures less than 800° F. is preferable for recycling of the collected solder. For producing the filter 4, felt, Teflon®, Goretex®, methyl cellulose, steel wool, ceramic paper, and ceramic foam materials are usable, and again, use of a material which will burn with little or no residue at temperatures less than 800° F. is preferable for recycling of the collected solder. As for the collection chamber part 10, it can be formed of paper, molded paper, cardboard, sheet metal, spring metal, or plastic with preference being given to those materials which will burn with little or no residue at temperatures less than 800° F. is preferable for recycling of the collected solder. With the entire capsule 1 made of material(s) which will burn with little or no residue at temperatures less than 800° F., the entire filled capsule can simply be thrown into a solder pot which, when full, can be sent to a solder reclamation facility where the capsule materials are burned off and the solder recovered.

With the foregoing in mind, specific examples of collection chamber part 10 and the manner in which it is supported in the outer tube 2 raised off of the filter 4 and creating one or more air channels 12 will be described. The filter 4 and outer tube 2 are the same as described above in these examples.

FIGS. 2–5 show an embodiment in which a collection chamber part 10' is formed from a blank B (FIG. 4) of corrugated paper which is rolled and inserted within the outer tube 2. The blank B has a main portion 10'a which is essentially a rectangle, one end of which has been cut at an angle producing a short longitudinal side and a long longitudinal side. A thin strip portion 10'b of the corrugated paper blank B extends perpendicularly from the long longitudinal side at a distance from the angle cut end which corresponds to the height of the plenum 14 to be created.

Figure 2:
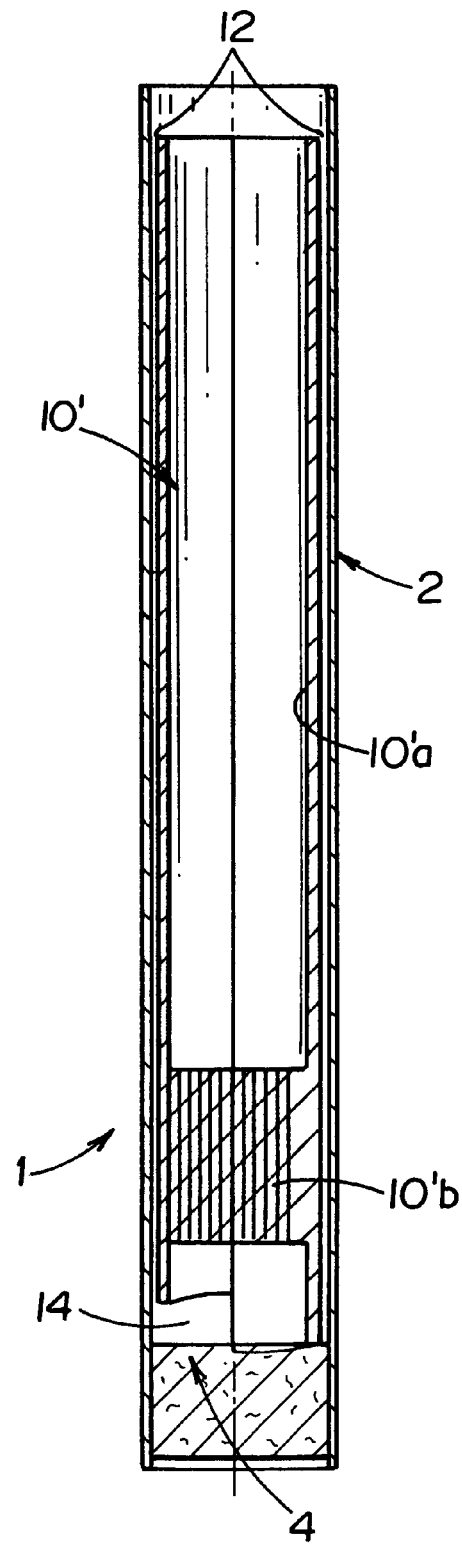
FIG. 2 is a longitudinal cross section of a first embodiment of a solder receiving capsule in accordance with the present invention.
Figure 3:
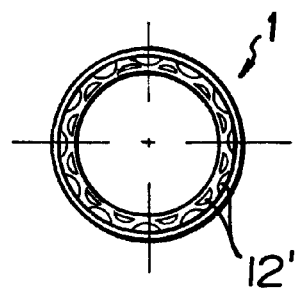
FIG. 3 is an end view of the solder receiving capsule of FIG. 2.

Collection chamber part 10' is formed by rolling up the blank tightly, starting at the free end of the thin strip portion 10'b, until the cylindrical shape shown in FIG. 5 is formed. The resulting chamber part 10' is inserted into the outer tube until the angle cut end of the long longitudinal side hits the filter 4 as shown in FIG. 2. As is apparent from FIGS. 2 & 3, the corrugations form a ring of longitudinally directed air channels 12' along the length of the chamber part 10' through which the air and fumes can pass to the plenum 14 and out through the filter 4. In this regard, it can be seen how the angle cut causes the ends of all except a few of the channels 12' to be axially displaced away from the filter 4. However, by making the corrugations sufficiently small, solder will solidify on their ends and will not pass through them, so that the rolled thin strip 10'*b* effectively presents a solid bottom to the solder collected in the chamber formed by the rolled main portion 10'*a*.

By way of example only, it is noted that a capsule 1 in accordance with the embodiment of FIGS. 2–5, may use blank B have a main portion 10'*a* with a long side 2.75" long, 2.12" to the strip portion 10'*b* and 0.25" from the strip portion 10'*b* to the angle cut end, a short side than is 2.6" long, and a width of 1.06". The strip portion 10'*b* in this example would have a length of 3.31". The corrugations can be 0.09" center-to-center with an outside height of 0.04". When tightly rolled, the resulting chamber part 10' would have an outside diameter of 0.384".

Figure 8:
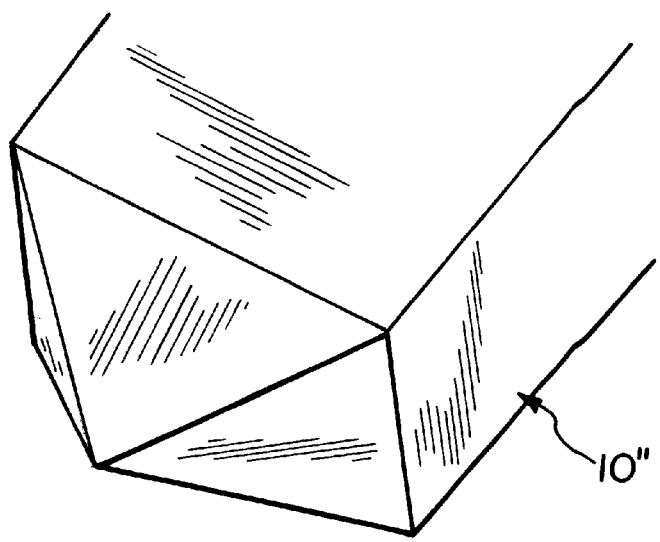
FIG. 8 is a perspective view of the closed end of the insert of the embodiment of FIGS. 6 and 7.

Turning now to FIGS. 6–8, another embodiment of a collection chamber part 10" for the solder collecting capsule 1 will now be described which is preferred to that of FIGS. 2–5 because it has an even higher volumetric efficiency and is easier to produce.

In particular, the collection chamber part 10" is formed of a hollow obelisk-shaped part that can, advantageously be formed of molded paper pulp material. As can be seen from FIG. 6, the collection chamber part 10" is inserted into the outer tube 2 in an inverted orientation so that the point of the obelisk shape rests on the filter 4 and with its base directed toward the open end of the capsule 1. Because the collection chamber part 10" has a polygonal cross section and the outer tube 2 is circular, air channels 12" are created between the sides of the collection chamber part 10" and the inner wall of the outer tube 2. Thus, air and fumes can be exerted via these channels 12" while the solder is collected within the interior of the collection chamber part 10".

As an example, the collection chamber part 10" can have sides of a length of 2.675" and width of 0.272", and the pyramidal peak (see FIG. 8) can have a height of 0.075". Such a collection chamber part 10" is suitable for use in an outer tube having an inside diameter of 0.384".

Figure 9:
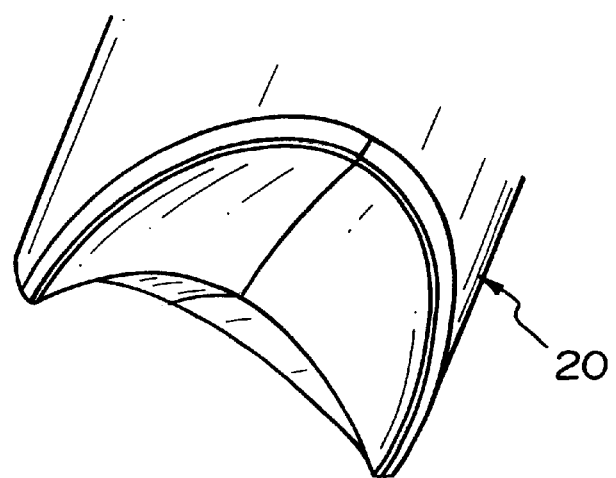
FIGS. 9–12 each show an alternative standoff for supporting an insert in a solder receiving capsule in accordance with the present invention.
Figure 10:
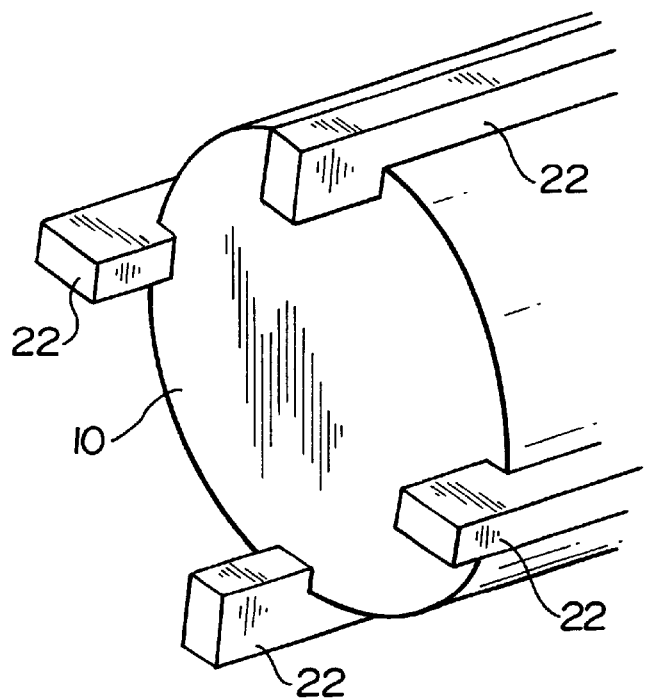
Figure 11:
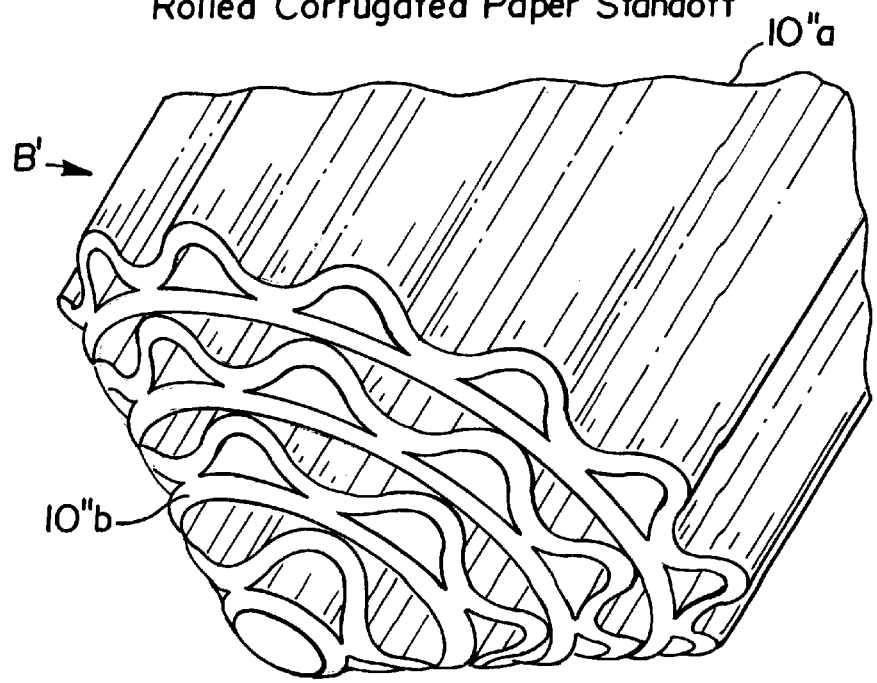
Figure 12:
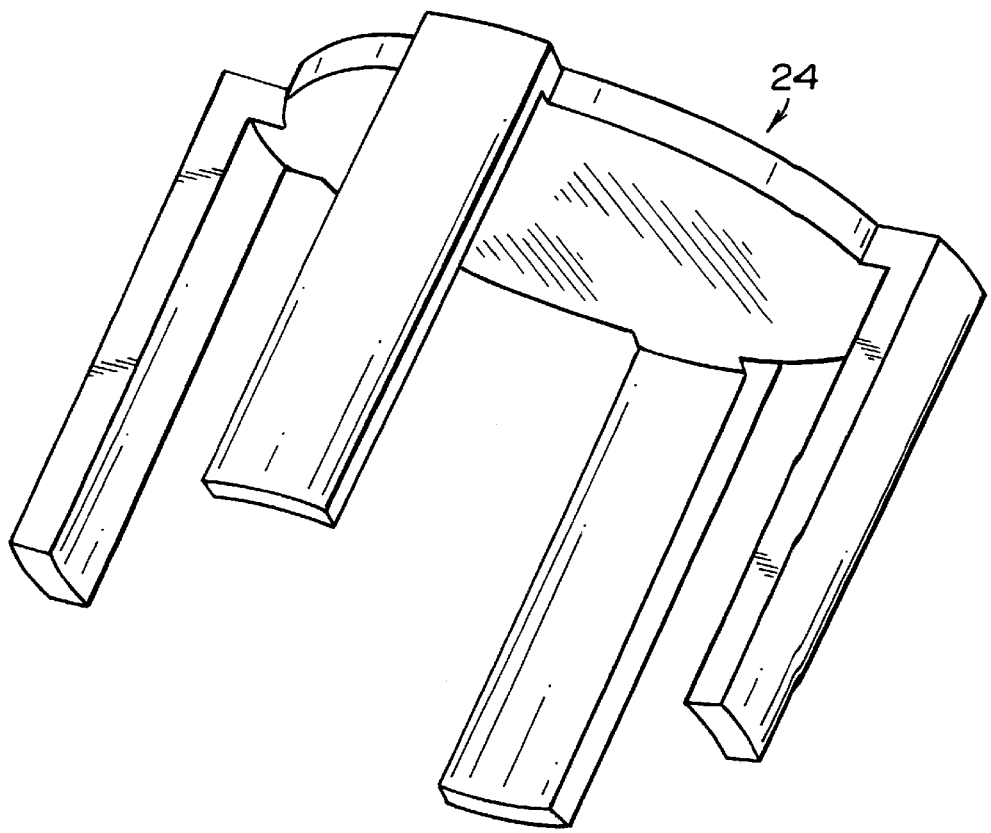
Figure 13:
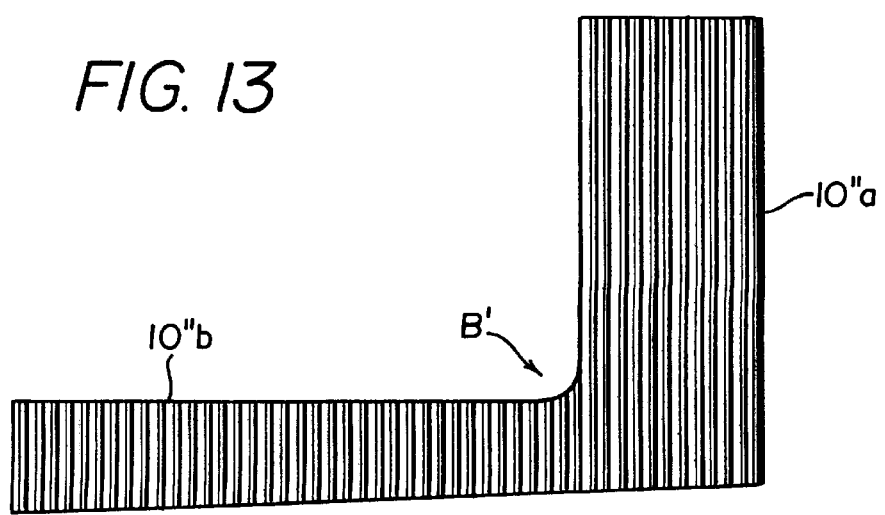
FIG. 13 is a plan view of a corrugated paper blank for forming the insert of the FIG. 11.

FIGS. 9–12 show other alternatives for the collection chamber part in accordance with the present invention. For example, collection chamber part 10 can be a rolled kraft paper tube 20, the end of which has been pinched to create a standoff as shown in FIG. 9. Furthermore, instead of providing a standoff as part of the chamber part 10', 10", separate molded plastic standoffs can be utilized, such as L-shaped legs 22 of FIG. 10 or the die cut paper table 24 of FIG. 12. Still further, instead of angle-cutting the corrugated paper blank B of the first embodiment, a blank B' having a fully rectangular main portion 10"*a* and having a thin portion 10"*b* positioned one end of the main portion, as shown in FIG. 13, can be used. In such a case, by having the thin portion 10"*b* of a width that increases by an amount corresponding to that of the angle cut of blank B at the side that faces oppositely from the open end of the collection chamber so that a standoff as shown in FIG. 11 is produced when the blank B' is rolled.

Having described the solder receiving capsule 1 in accordance with the present invention, in conjunction with FIGS. 14 & 15, a vacuum desoldering tool 30 in accordance with the present invention for use with any of the described solder receiving capsules with now be described along with the manner in which a new solder receiving capsule is exchanged with a used one.

Figure 14:
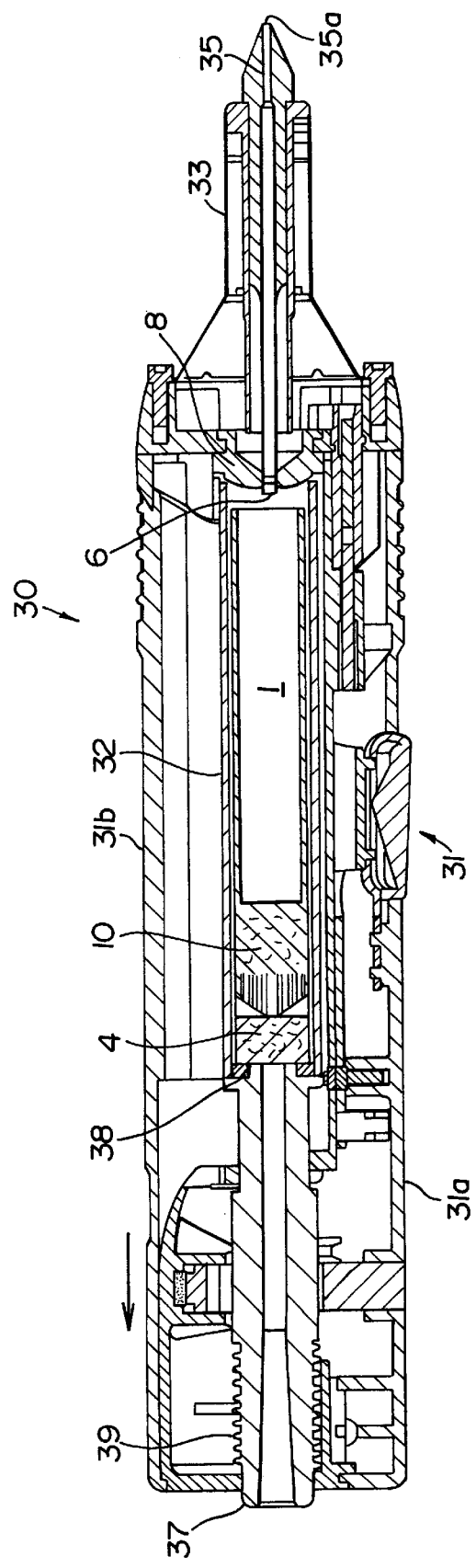
FIG. 14 is a longitudinal cross-sectional view of a continuous vacuum desoldering tool in accordance with the present invention for use with any of the solder receiving capsules in accordance with the present invention.
Figure 15:
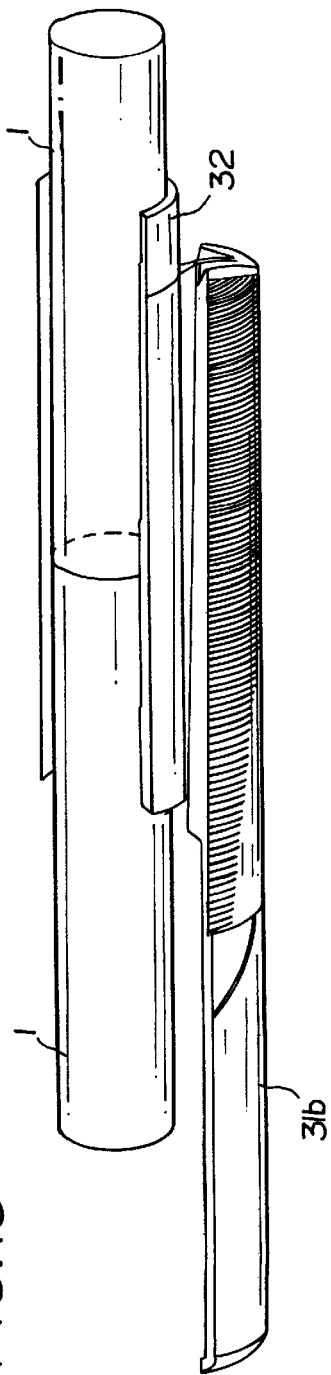
FIG. 15 is a diagram illustrating the manner in which a used solder receiving capsule in accordance with the present invention is replaced by a new one.

The vacuum desoldering tool 30 shown in FIG. 14 is of the pencil grip type which is normally held in a generally vertical orientation in use. However, it should be appreciated that the invention is not limited to this specific type of desoldering tool which is being used as an example, the invention being applicable to pistol grip and other types of solder-extracting vacuum desoldering tools as well.

Desoldering tool 30 has an elongated body 31 on one end of which is a heating cartridge 33 into an aperture of which an exchangeable, hollow desoldering tip 35 is inserted with a riser tube 6 of the desoldering tip 35 extending into the seal 8. At the opposite end of the body 31 of the desoldering tool 30 is a vacuum line connector 37 for connection of the desoldering tool 30 to a vacuum line leading from a pump or other vacuum source (not shown). The body 31 of the desoldering tool 30 is itself formed of a main body part 31*a* which carries heating cartridge 33, vacuum line connector 37, operating switch wiring, etc., and a detachable capsule holding part 31*b* which carries a capsule holding tube 32 for holding a solder receiving capsule 1 in axial alignment between an inner end of the vacuum connector 37 and the seal 8 with riser tube 6 in it. The inner end of the vacuum line connector 37 has a sealing ring 38 which is pressed against the end of the solder receiving capsule 1 having the filter 4 under the action of a spring 39 and also acts to press the open end of the capsule 1 against the seal 8, the capsule holding tube 32 against a shoulder of seal 8, and the front end of the removable body part 35*b* against the a front end of the main body part 31*a* fixing all of these parts in place. In this arrangement, when a vacuum is drawn on the capsule filter 4 via the connector 37, once the capsule has been evacuated, a suction effect is produced at the inlet of the through passage 31*a* of the desoldering tip 35 to thereby draw melted solder and fumes into and through the desoldering tip 35 and its riser tube 6 into the solder collecting capsule 1, the solder being retained in the capsule 1 and the fumes being extracted through the vacuum connector.

Once the solder collecting capsule 1 is full, it needs to be exchanged for a new, empty one. For this purpose, the removable body part 31*b* is slid in the direction of the arrow shown in FIG. 14 against the force of spring 39, and after it has been slid sufficiently rearward, it can be swung away from the main body part 31*a* and lifted off of the connector 37, taking the solder collecting capsule 1 with it. FIG. 15 shows the removable body portion 31*b* with a longitudinally extending half of the capsule holding tube 32 removed to more clearly demonstrate the capsule exchanging process. As can be appreciated from this view, the filled (front) capsule is removed from the capsule holding tube 32 simply by pushing a new (rear) capsule 1 into the holding tube 32 and forcing out the filled capsule which, if made of materials that can be burnt off without a significant residue, can be allowed to drop into a solder pot for reclamation of the removed solder. Thereafter, the removable body part 31*b* can be quickly and simply remounted with the new capsule 1, allowing desoldering to continue with minimal downtime.

While solder collecting capsule and extraction type desoldering tool for use as described so far are advantageous as compared to the prior art, they are subject to the potential problems that it is possible to draw molten solder into the tool if the tool is inadvertently operated without a solder collecting capsule in place or with the solder collecting capsule inserted backwards, the vacuum seal is subjected to contact with the molten solder being extracted and thus deteriorates with use and must be replaced regularly, it is possible under certain conditions that the molten solder extracted into the capsule will flow back into the riser tube of the tool. These potential problems are eliminated in the features that will now be described relative to the most preferred embodiments.

Figure 16:
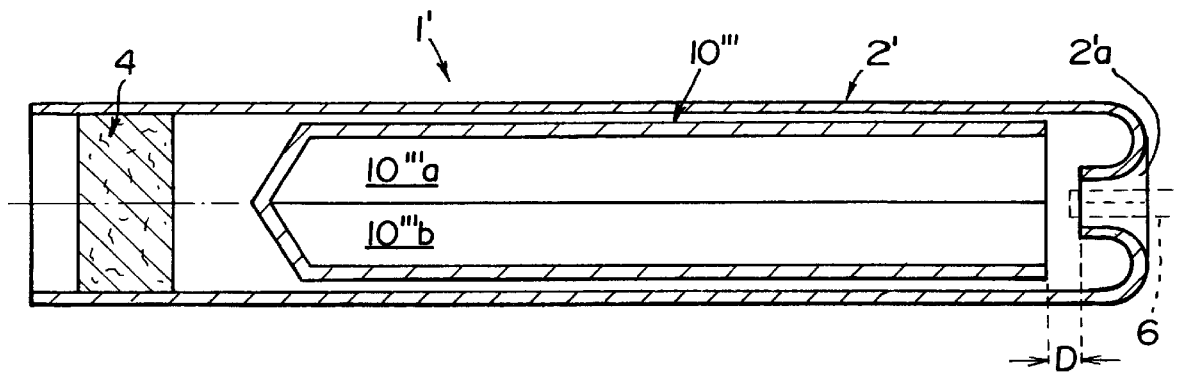
FIG. 16 is cross-sectional view corresponding to FIG. 2, but of a particularly preferred embodiment of solder receiving capsule in accordance with the present invention.
Figure 17:
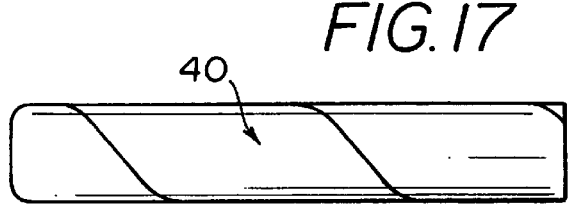
FIG. 17 is a elevational view of a rolled paper outer tube of the capsule shown in FIG. 16.
Figure 21:
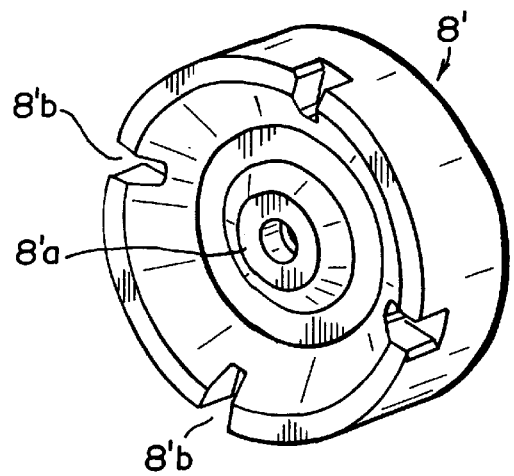
FIG. 21 is a perspective view of a vacuum seal for use with a solder receiving capsule using the outer tube shown in either of FIGS. 16 or 19.
Figure 22:
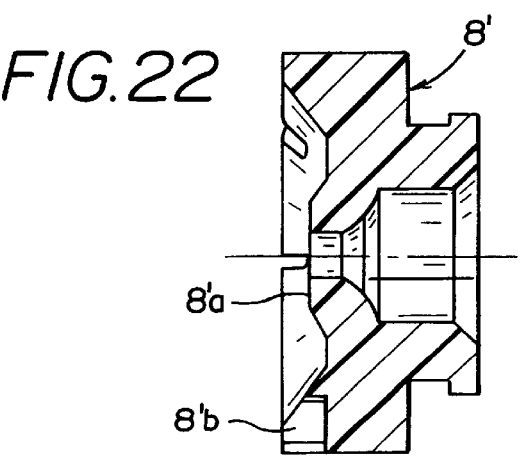
FIG. 22 is a cross-sectional view of the seal of FIG. 21.

A primary and significant distinction of the embodiment of the modified solder receiving capsule 1' shown in FIG. 16 is that its outer tube 2' of formed of cardboard paper that has been helically rolled into tube having an end part in the shape of a semi-torus with an opening 2'a for riser tube 6 (part of which is shown in phantom outline in this figure) in the radial center area thereof. The opposite end of outer tube 2' is closed by porous filter 4. The semi-toroidal end part of the outer tube 2' allows molten solder to run back toward the riser tube 6 without flowing back into the riser tube. The semi-toroidal end also co-acts with a modified seal 8' as is described in greater detail below relative to FIGS. 21 & 22.

Figure 18:
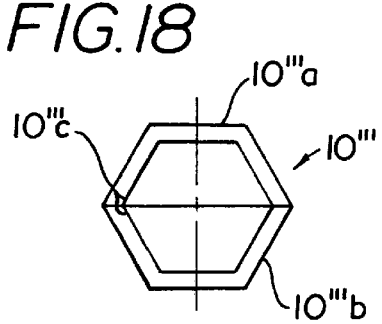
FIG. 18 is an elevational view of the open end of the insert of the FIG. 16 capsule.

While any of the solder collection chamber parts described so far may be used with outer tube 2', FIGS. 16 & 18 show a particularly advantageous solder collection chamber part 10'''. The solder collection chamber part 10''' is formed of molded recycled paper having two half shells 10'''a, 10'''b that are connected by an integral flexible hinge portion 10'''c. The molded paper part is folded about the flexible hinge portion 10'''c to form chamber part 10''' and by coordinating the maximum outer diameter of the chamber part 10''' to the inner diameter of the outer tube 2', the folded together half shells 10'''a, 10'''b are held together by engagement with inner inner wall of outer tube 2'. In this regard, it has been found that it is not necessary to form a tight seal between the half shell, it being sufficient that they are close enough together to preclude molten solder from flowing out of the solder collection chamber part 10''' at their parting line. The advantage to this type of solder collection chamber part is that it can be produced easily and more inexpensively. It is also noted that, while the pointed, closed end of the solder collection chamber part 10''' is capable of serving as a standoff as described above relative to the other solder collection chamber parts, the use of a standoff is not necessary as the snug-fitting of the solder collecting chamber part 10''' in the outer tube 2' is normally sufficient to hold the solder collection chamber part in place.

What is more important is the location of the open end of the solder collection chamber part 10''' relative to the semi-toroidal end part of the outer tube 2', i.e., distance D in FIG. 16. That is, the open end of the solder collection chamber part 10''' (or if any of the other chamber parts) should not be more than about 0.25" from the outer end of the semi-toroidal end part of the outer tube 2' to insure that the molten solder will flow into the solder collection chamber part 10''' instead of into the vacuum channels formed between the chamber part and the outer tube 2'. Use of a smaller distance reduces the capacity of the chamber part but otherwise has no effect.

In addition to the noted back-flowing preventing advantage, the use of the outer tube 2' with the semi-toriodal end part provides even greater benefits in conjunction with the silicone capsule end seal 8', which is concave, in contrast to the convex shape of seal 8 shown in FIGS. 1 & 14. More specifically, end seal 8' has an inner contour shaped to seat the toriodal end part therein with portion 8'a engaging the opening 2'a. As a result, the semi-toroidal end part of the outer tube 2' shields the seal 8' from the molten solder, for the most part, extending the life of the seal by preventing premature degradation and failure thereof. In this connection, it is important that the riser tube 6 extend far enough from the inner side seal 8' to insure that the molten solder emerging from it will be drawn into the chamber part without contacting 8'. At the same time, care must be taken to prevent the riser tube 6 from projecting too far since such can cause the solder to cool and harden in the riser tube, thereby plugging it. This distance must be determined empirically for the particular arrangement used.

Another advantage associated with the use of outer tube 2' and capsule end seal 10''' is that, due to the provision of notches 8'b, should the capsule 1' be inserted in the reversed direction, i.e., with the end with the filter 4 directed against seal 8', vacuum seal will not be established, so that the tool cannot be operated so as to draw solder into it. The same is true if the capsule 1' is omitted altogether because it, then, is not possible for the capsule holding part to engage against the seal 8' in a manner creating a vacuum seal. Thus, inadvertent damage to the desoldering tool is avoided through this modification.

Figure 23:
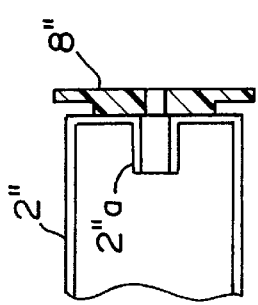
FIGS. 23–25 each show an alternative forms for the inlet end of the solder receiving capsule and the vacuum seal for use therewith.
Figure 24:
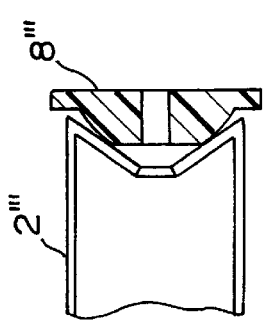
Figure 25:
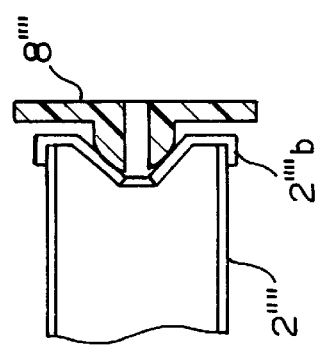

It is noted that, while the semi-toroidal shape is particularly easy and economic to produce, especially when made of rolled paper, similar advantages can be obtained using capsules with ends having other reentrant shapes with suitably configured seals. FIGS. 23–25 show three examples of such alternative configurations. FIG. 23 shows an outer tube 2" with a cylindrical end having a tubular opening 2"a, against which a seal 8" having a disk-shape, while FIG. 24 shows an outer tube 2''' having a conically recessed end against which is engaged by a seal 8''' having a frusto-conical seal face. FIG. 25 shows a modified form of the FIG. 22 embodiment in which the outer tube 2"" has its end with the opening 2a"" formed of a separate reusable end part 2""b. For example, the body of the could be a paper tube while the end part 2""b is made of plastic. While not shown, each of the seals of these alternative embodiments can be provided with notches or openings that are rendered in effective if the capsule is properly inserted but create vacuum leakage paths if it is omitted or inserted improperly.

Figure 19:
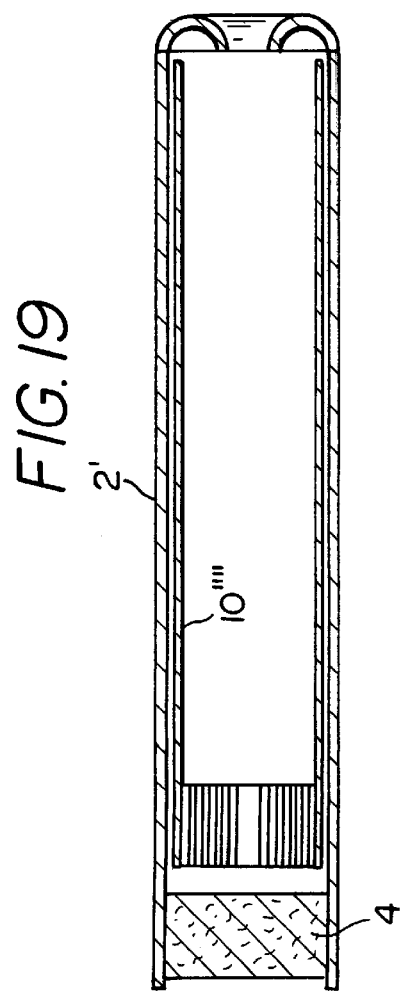
FIG. 19 is cross-sectional view corresponding to FIG. 16, but showing an alternative insert in the solder receiving capsule.
Figure 20:
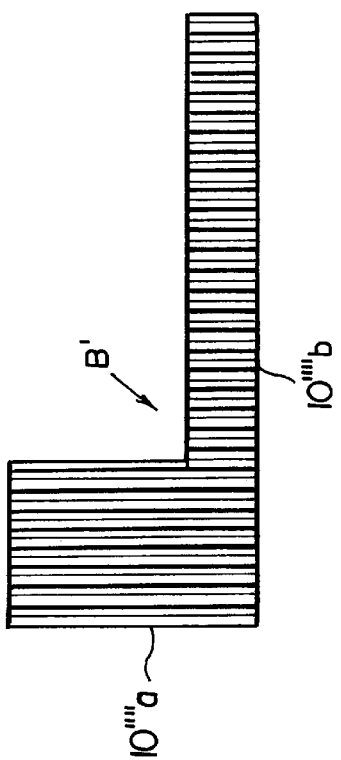
FIG. 20 is a plan view of a corrugated paper blank for forming the alternative insert of FIG. 19.

Lastly, FIGS. 19 & 20 show a modified form of the corrugated paper blank type chamber part shown in FIGS. 13. This version reflects the above noted fact that a snug fit can make use of a standoff unnecessary. In this case, the blank B" has fully rectangular main portion 10""a (corresponding to portion 10"a) and a fully rectangular thin portion 10""b (corresponding to portion 10"b) positioned at one end of the main portion as shown in FIG. 20. In this case, when rolled, the thin portion produces a flat end to the chamber part, as shown in FIG. 19, which is held spaced from the filter 4 by engagement of the outer surface of the resulting chamber part 10"" with the inner wall of the outer tube 2'.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. A disposable solder receiving capsule for a hand held vacuum solder extracting desoldering tool comprising an outer tube which is closed at one end by a porous filter and is provided with an opening at an opposite end, and a hollow solder collection chamber part having a tubular member with an open first end and an opposite, second end which is closed with respect to the passage of solder therethrough, a solder receiving space being formed in the solder collection chamber part between said first and second ends, wherein the solder collection chamber part is concentrically positioned within the outer tube with an air plenum disposed between the filter and an outer side of the second end of the solder collection chamber part which faces the filter, and with at least one air channel extending the length of the solder collection chamber part for providing a path for gases entering the open end of the outer tube to the plenum and the filter, said at least one air channel being separated from said solder receiving space, running along an outer side of the solder collection chamber part.

2. The disposable solder receiving capsule according to claim 1, wherein a standoff is provided for supporting the solder collection chamber part on the filter.

3. The disposable solder receiving capsule according to claim 1, wherein the standoff is formed as part of the solder collection chamber part.

4. The disposable solder receiving capsule according to claim 3, wherein the solder collection chamber part has an obelisk shape and the standoff is formed by a peak of the obelisk shape.

5. The disposable solder receiving capsule according to claim 4, wherein the solder collection chamber part has a polygonal cross section with a diameter corresponding closely to an internal diameter of a circular cross section of the outer tube, the at least one air channel being formed between sides of solder collection chamber part and the outer tube.

6. The disposable solder receiving capsule according to claim 3, wherein the solder collection chamber part is formed of a rolled corrugated paper blank having a main body portion and an elongated thin portion extending outwardly from a long side of the main body portion near or at an end thereof; and wherein said at least one air channel is formed by internal spaces of corrugations of the rolled corrugated blank, said internal spaces being small enough to inhibit solder from flowing therethrough.

7. A disposable solder receiving capsule for a hand held vacuum solder extracting desoldering tool comprising an outer tube which is closed at one end by a porous filter and is provided with an opening at an opposite end, and a hollow solder collection chamber part having a tubular member with an open first end and an opposite, second end which is closed with respect to the passage of solder therethrough, a solder receiving space being formed in the solder collection chamber part between said first and second ends, wherein the solder collection chamber part is concentrically positioned within the outer tube with an air plenum disposed between the second end of the solder collection chamber part and the filter and with at least one air channel extending the length of solder collection chamber part for providing a path for gases entering the open end of the outer tube to the plenum and the filter, said at least one air channel being separated from said solder receiving space; and wherein the outer tube, filter and solder collection chamber part are all formed of materials which are shape-sustaining when exposed to a temperature of 400° F., are not reactive with either of solder and flux, and which will burn with little or no residue at a temperature less than 800° F.

8. The disposable solder receiving capsule according to claim 1, wherein the outer tube, filter and solder collection chamber part are all formed of a material selected from the group consisting of paper, molded paper pulp, or cardboard.

9. The disposable solder receiving capsule according to claim 1, wherein the solder collection chamber part is formed of a rolled corrugated paper blank having a main body portion and an elongated thin portion extending outwardly from a long side of the main body portion near or at an end thereof; and wherein said at least one air channel is formed by internal spaces of corrugations of the rolled corrugated blank, said spaces being small enough to inhibit solder from flowing therethrough.

10. The disposable solder receiving capsule according to claim 1, wherein the solder collection chamber part is formed of a molded paper part having two half shells integrally connected by a flexible hinge portion, said molded paper part having been folded about said flexible hinge portion to form said chamber partand being held together by engagement with an inner wall of said outer tube.

11. A disposable solder receiving capsule for a hand held vacuum solder extracting desoldering tool comprising an outer tube which is closed at one end by a porous filter and is provided with an opening at an opposite end, and a hollow solder collection chamber part having a tubular member with an open first end and an opposite, second end which is closed with respect to the passage of solder therethrough, a solder receiving space being formed in the solder collection chamber part between said first and second ends, wherein the solder collection chamber part is concentrically positioned within the outer tube with an air plenum disposed between the second end of the solder collection chamber part and the filter and with at least one air channel extending the length of solder collection chamber part for providing a path, for gases entering the open end of the outer tube to the plenum and the filter, said at least one air channel being separated from said solder receiving space; and wherein the end of the outer tube having the opening has re-entrant shape with said opening being in the radial center area thereof.

12. The disposable solder receiving capsule according to claim 1, wherein the outer tube is formed of a rolled paper part.

13. The disposable solder receiving capsule according to claim 1, wherein the solder collection chamber part is held in said outer tube by engagement forces therebetween.

* * * * *

UNITED STATES PATENT AND TRADEMARK OFFICE
CERTIFICATE OF CORRECTION

PATENT NO. : 6,237,831 B1
DATED : May 29, 2001
INVENTOR(S) : David W. Lawrence et al.

Page 1 of 1

It is certified that error appears in the above-identified patent and that said Letters Patent is hereby corrected as shown below:

<u>Title page,</u>
The Related U.S. Application Data under [63] should read as follows:

[63] -- Continuation-in-part of application No. 09/289,720, filed on April 12, 1999, issued as U.S. Patent No. 6,816,387, issued February 13, 2001. --

Signed and Sealed this

Thirtieth Day of October, 2001

Attest:

NICHOLAS P. GODICI
Attesting Officer
Acting Director of the United States Patent and Trademark Office